United States Patent [19]
Chen

[11] Patent Number: 5,915,675
[45] Date of Patent: Jun. 29, 1999

[54] SEAT SUSPENSION DEVICE

[76] Inventor: Hui-Hsiung Chen, No. 34, Chia-Hou Rd., Liu-Feng, Tsuen, Waipu Hsian, Taichung Hsien, Taiwan

[21] Appl. No.: 08/927,403

[22] Filed: Sep. 10, 1997

[51] Int. Cl.$^6$ ........................................................... B62J 1/02
[52] U.S. Cl. ........................ 267/132; 267/153; 297/195.1
[58] Field of Search ..................................... 248/592, 599, 248/632; 280/274, 275, 276, 281.1, 283; 297/195.1, 199, 200, 208, 209; 267/131, 132, 142, 152, 153

[56] References Cited

U.S. PATENT DOCUMENTS

| | | | |
|---|---|---|---|
| Re. 24,911 | 12/1960 | Leja | 267/132 |
| 5,294,174 | 3/1994 | Bigolin | 297/212 |
| 5,443,301 | 8/1995 | Lal | 297/195.1 |
| 5,489,139 | 2/1996 | McFarlaud | 297/195.1 |
| 5,547,155 | 8/1996 | Hertug | 248/219.2 |
| 5,553,880 | 9/1996 | McJuukiu et al. | 280/283 |
| 5,702,093 | 12/1997 | Liao | 267/132 |

*Primary Examiner*—Chris Schwartz
*Attorney, Agent, or Firm*—Rosenberg, Klein & Bilker

[57] ABSTRACT

A seat suspension device includes a base member disposed to a top of a seat tube, two bars respectively and pivotally connected to the base member at a respective one of two ends thereof, the other end of each of the two bars pivotally connected between two plates to which two clamping devices are disposed for being connected to a seat, and a deformable device having one of two ends thereof pivotally connected to the base member and the deformable device further having two studs extending in opposite therefrom to be pivotally connected to the two plates. The deformable device is disposed laterally to a mechanism including the two bars and the two plates so that it is allowed to have a long depression stroke.

3 Claims, 7 Drawing Sheets

SEAT SUSPENSION DEVICE

BACKGROUND OF THE INVENTION

1. Field of the Invention

The present invention relates to suspension device and, more particularly, to an improved seat suspension device for a bicycle wherein a deformation mean thereof is disposed to a rear side of a seat of the bicycle.

2. Brief Description of the Prior Art

FIG. 1 shows a conventional seat suspension means which includes a first bar 10 fixedly and transversely connected to a top of a seat tube 11 of a bicycle, a second bar 12 connected to a bottom of a seat 13, at least two links 14 pivotally and in parallel connected between a first end of the first bar 10 and a second end of the second bar 12, and a cylinder 15 with a spring 16 mounted thereto connected between a second end of the first bar 10 and a first end of the second bar 12. Accordingly, when a shock from a rough road is transmitted to the seat tube 11, the cylinder 15 and the spring 16 are compressed and the seat 13 is lowered to absorb the shock. In order to absorb a large impact applied to the bicycle, the spring 16 has to be a high rate spring which is expensive and has a worse performance to minor and frequent bumps. Furthermore, the stroke of the cylinder 15 has to be short because it is disposed between the seat and the seat tube 11, otherwise the seat tube of a standard bicycle frame must be cut or a total height of the seat and the seat tube will too high. The seat 13 will be lowered along a path of sharp arc and has only a short circumferential length because the short stroke of the cylinder 15, so that a rider could drop from the seat 13 when the suspension device is actuated.

Most of the prior arts that consist of sliders, are taking the load down a single axis, which typically binds because the forces are applied to the sliding surfaces out of plane, which adds friction to the device. This restricts the features or the function of the present suspension devices.

The present invention intends to provide an improved seat suspension device to mitigate and/or obviate the above-mentioned problems.

SUMMARY OF THE INVENTION

The present invention provides a seat suspension device which comprises a base member capable of being disposed to a seat tube and having two lugs extending therefrom, each of the lugs having a first and a second hole.

A first bar has a first upper tube transversely disposed to an upper end thereof and a first lower tube transversely disposed to a lower end thereof. The first lower tube is pivotally disposed between the two lugs and in alignment with the first holes, a cut-away portion defined transversely in the first lower tube.

A second bar has a second upper tube transversely disposed to an upper end thereof and a second lower tube transversely disposed to a lower end thereof. The second lower tube is pivotally disposed between the two lugs and in alignment with the second holes.

Two plates each have a first and a second aperture defined therein, and a recess defined in an inner side of a lower end thereof.

Two clamping means is fixedly mounted outside the two plates by extending a bolt through the clamping means, the first apertures and the second upper tube which is pivotally connected between the two plates. The other bolt extends through the clamping means, the two second apertures and the first lower tube which is pivotally connected between the two plates.

A deformable means has a rod extending from one of two ends thereof and the rod is pivotally connected between the two lugs. Two studs extend from two opposite sides of the deformable means and are pivotally received in the two recesses of the two plates.

It is an object of the present invention to provide a seat suspension device having a deformable means disposed laterally to a seat tube.

It is another object of the present invention to provide a seat suspension device having a long compression stroke of its deformable means.

It is a further object of the present invention to provide a seat suspension device having a long travel of the seat when a large impact is applied thereto.

It is still another object of the present invention to provide a seat suspension device which effectively prevents a rider from dropping from the seat.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
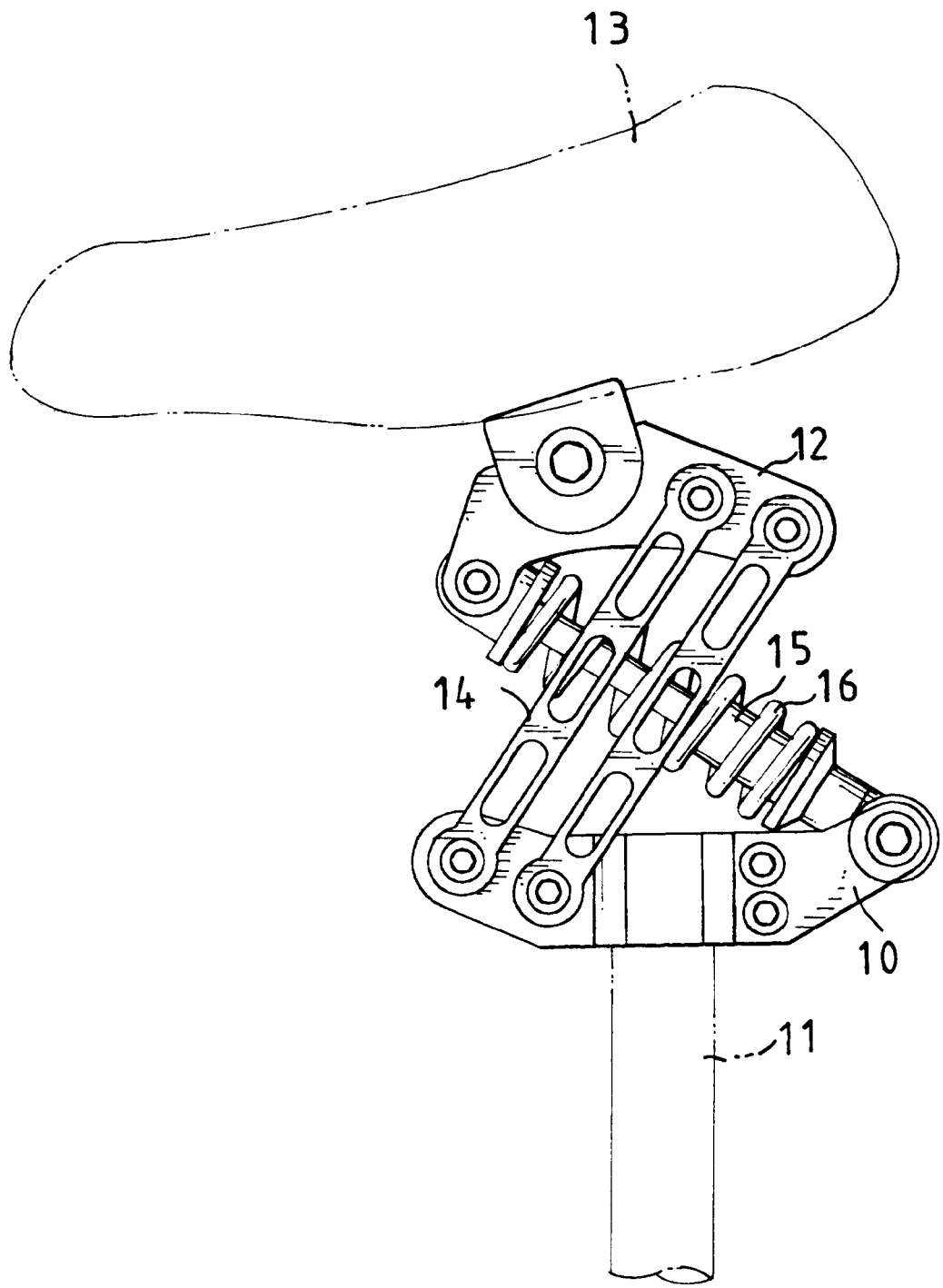
FIG. 1 is a side elevational view of a conventional seat suspension device.
Figure 2:
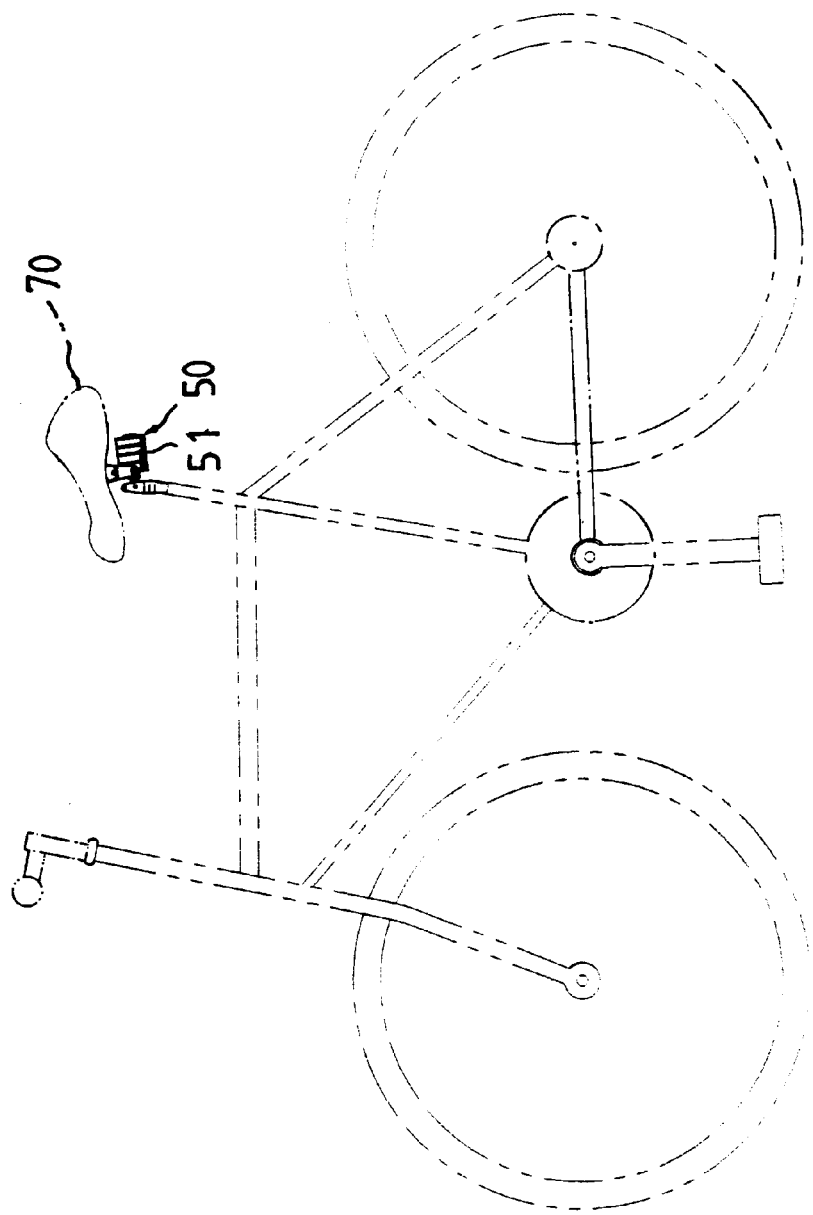
FIG. 2 is an illustrative view to show a seat suspension device in accordance with the present invention disposed to a bicycle shown in phantom lines.
Figure 3:
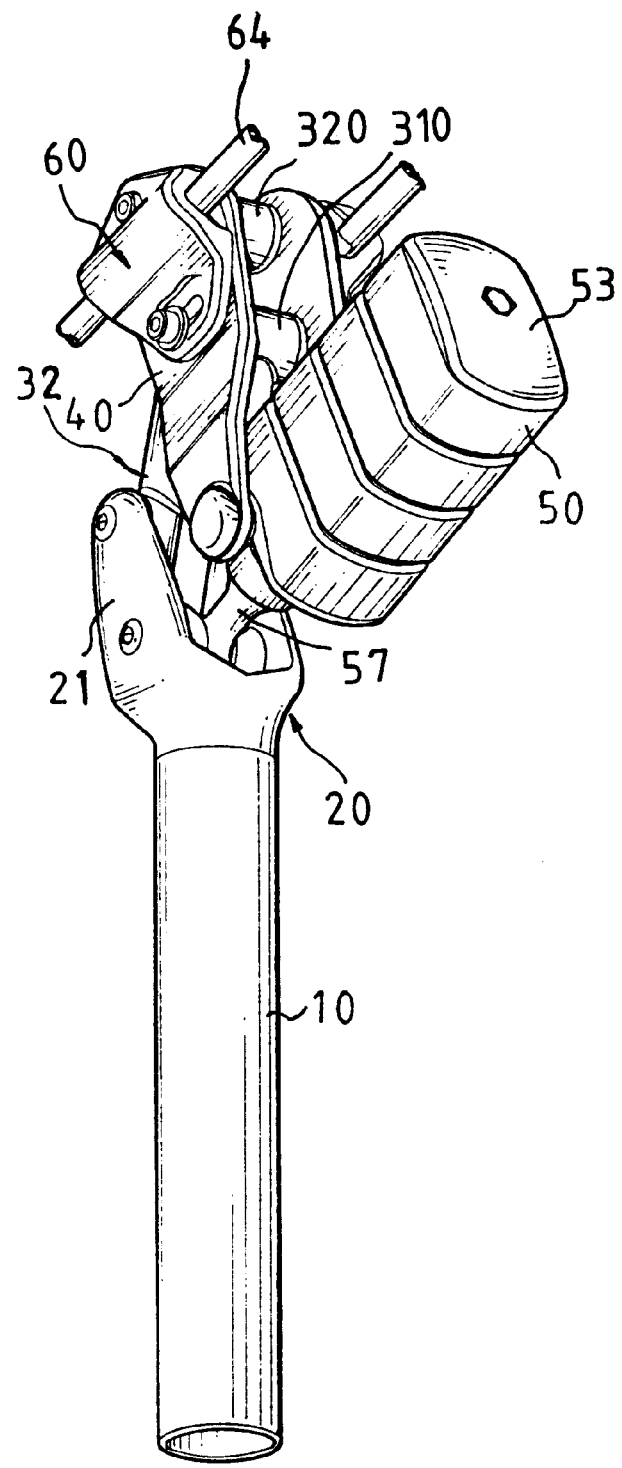
FIG. 3 is a perspective view of the seat suspension device in accordance with the present invention.
Figure 4:
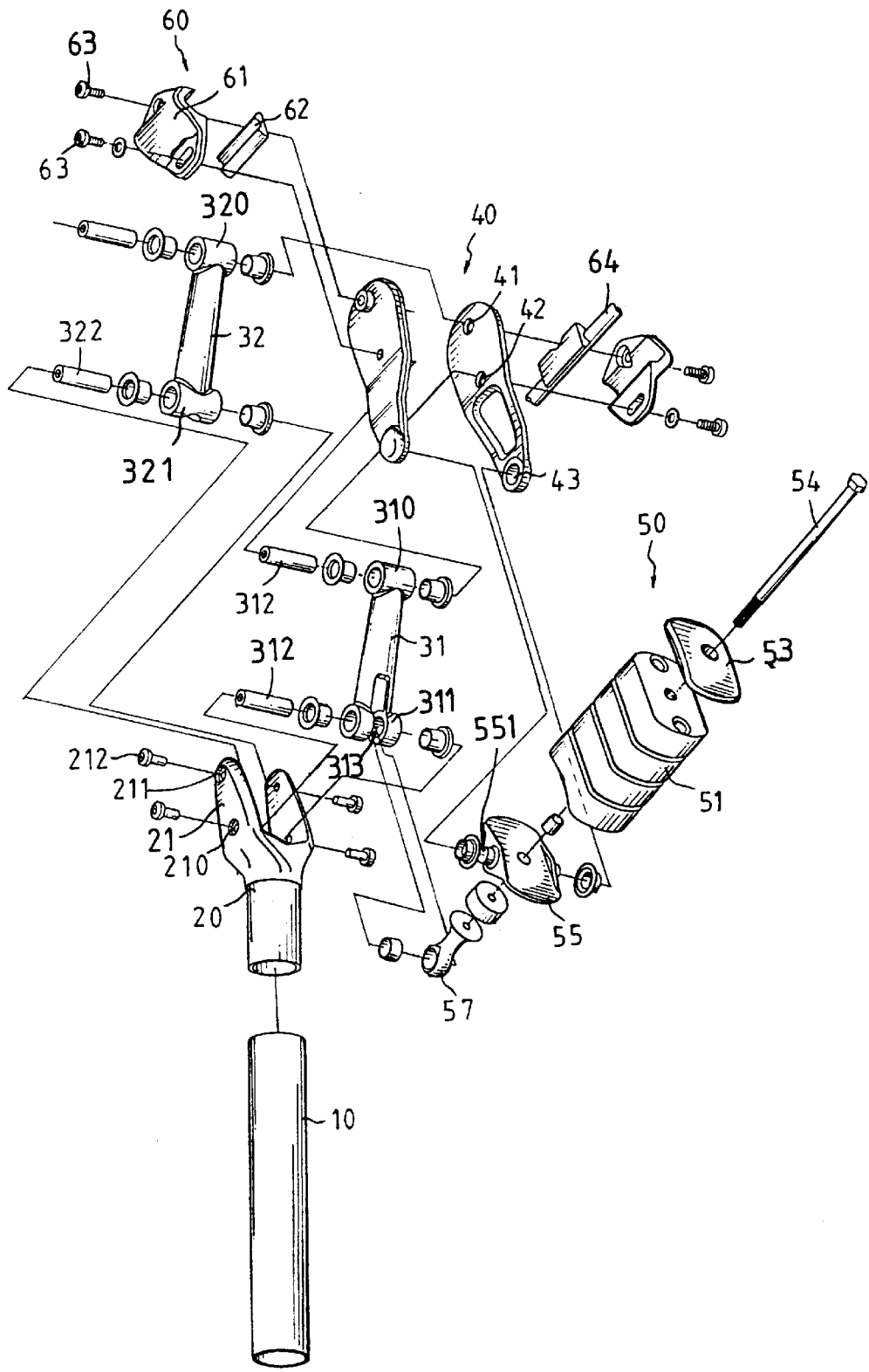
FIG. 4 is an exploded view of the seat suspension device in accordance with the present invention.

Referring to the drawings and initially to FIGS. 2 through 6, a seat suspension device in accordance with the present invention generally includes a base member 20 disposed to a top of a seat tube 10, the base member 20 having two lugs 21 extending inclinedly therefrom and each of the lugs 21 having a first and a second hole 210, 211 defined therethrough wherein the first holes 210 are located lower than the second holes 211.

A first bar 31 has a first upper tube 310 transversely disposed to an upper end thereof and a first lower tube 311 transversely disposed to a lower end thereof. The first lower tube 311 is pivotally disposed between the two lugs 21 and in alignment with the first holes 210 by a sleeve 312 and two rivets 212. A cut-away portion 313 is defined transversely in the first lower tube 311.

A second bar 32 has a second upper tube 320 transversely disposed to an upper end thereof and a second lower tube 321 transversely disposed to a lower end thereof. The second lower tube 321 is pivotally disposed between the two lugs 21 and in alignment with the second holes 211 by a sleeve 322 and two rivets 212.

Two plates 40 each have a first and a second aperture 41, 42 defined therein. A recess 43 is defined in an inner side of a lower end of each of the two plates 40.

Two clamping means 60 are respectively fixedly mounted outside the two plates 40 by extending a bolt 63 through the clamping means 60, the first apertures 41 and the second upper tube 320 which is pivotally connected between the two plates 40, and the other bolt 63' extending through the clamping means 60, the two second apertures 42 and the first lower tube 311 which is pivotally connected between the two plates 40. Each of the clamping means 60 comprises two parts 61, 62 and is able to securely clamp a seat rail 64 therebetween.

A deformable means 50 includes a stack of elastic blocks 51, an top cap 53 and a bottom cap 55 respectively disposed to two ends of the stack of elastic blocks 51 with a long bolt 54 extending therethrough, wherein the bottom cap 55 has a rod 57 extending therefrom and two studs 551 extending from two opposite sides thereof. The long bolt 54 is threadedly engaged with the rod 57 and the rod 57 is received in the cut-away portion 313 and pivotally connected between the two lugs 21. The two studs 551 are pivotally received in the two recesses 43 of the two plates 40. The deformable means 50 can be a spring, an air cylinder, an oil-dampening unit, steel coils, steel disks, or steel waves.

Figure 6:
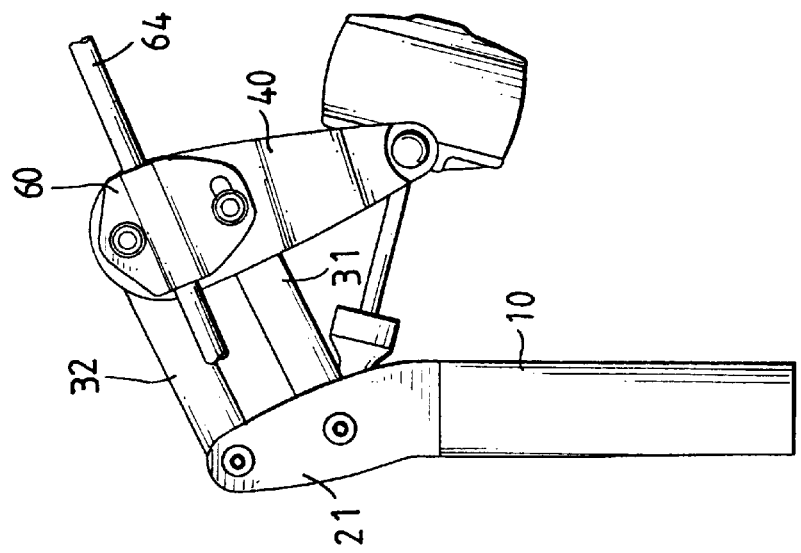
FIG. 6 is a side elevational view to show an operation status of the seat suspension device shown in FIG. 5.
Figure 5:
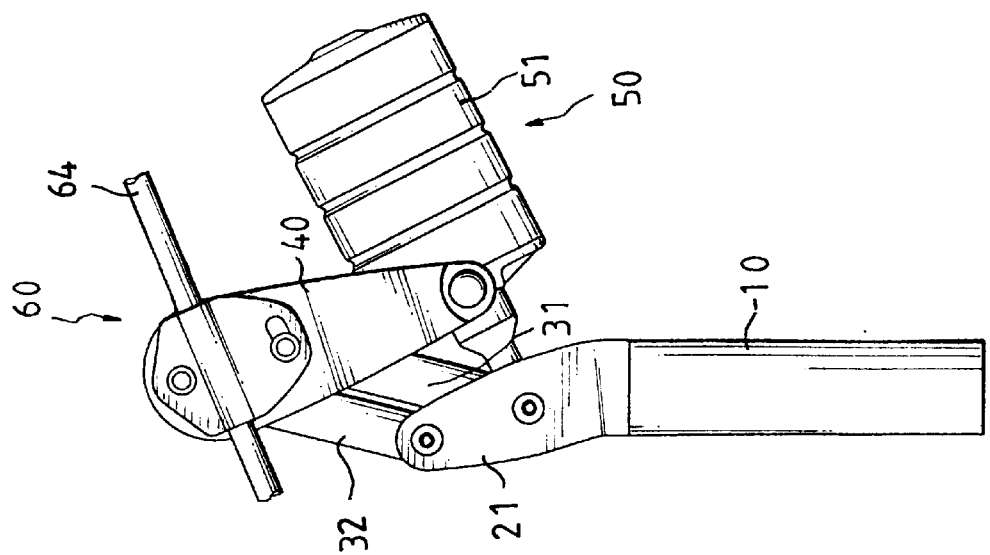
FIG. 5 is a side elevational view of the seat suspension device of the present invention when not actuated.

In FIGS. 5 and 6, when an impact is applied to the seat suspension device, a seat 70 (see FIG. 2) having its seat rails 64 clamped by the clamping means 60 is pivoted with the first and the second bar 31, 32 respectively pivoted about the first lower tube 311 and the second lower tube 321. In the meanwhile, the two plates 40 are pushed by the movement of the first and the second bar 31, 32 to push the bottom cap 55 to compress the stack of elastic blocks 51 to absorb the impact.

It is to be noted that a direction to which the stack of elastic blocks 51 are compressed toward away from a mechanism comprising the two bars 31, 32 and the two plates 40 so that the deformable means 50 may have a longer compression stroke. That is to say, sufficient suppleness of the device can be achieved. An arrangement of a length of each of the first and the second bar 31, 32 allows a front end of the seat 70 will lowered faster than a rear end of the seat 70, this gives additional stability to a rider on large compression.

Figure 8:
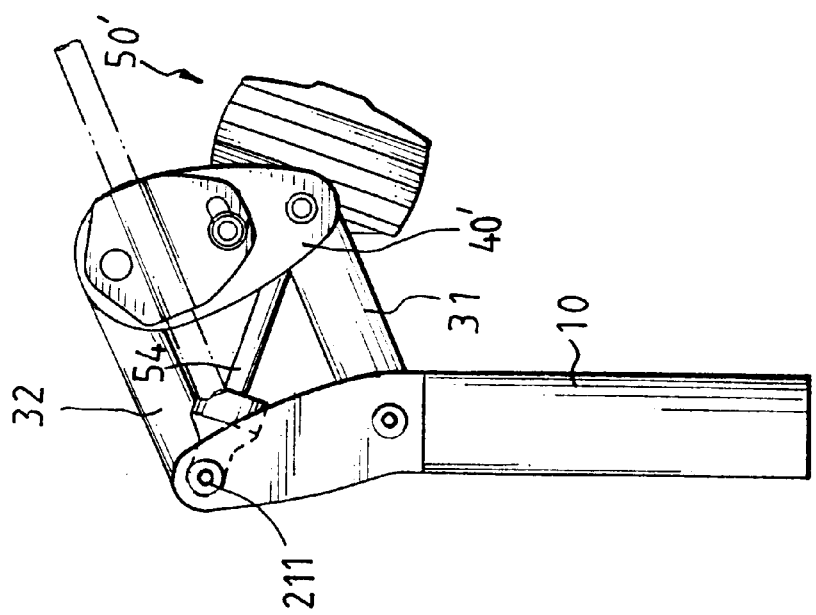
FIG. 8 is a side elevational view to show an operation status of the seat suspension device shown in FIG. 7.
Figure 7:
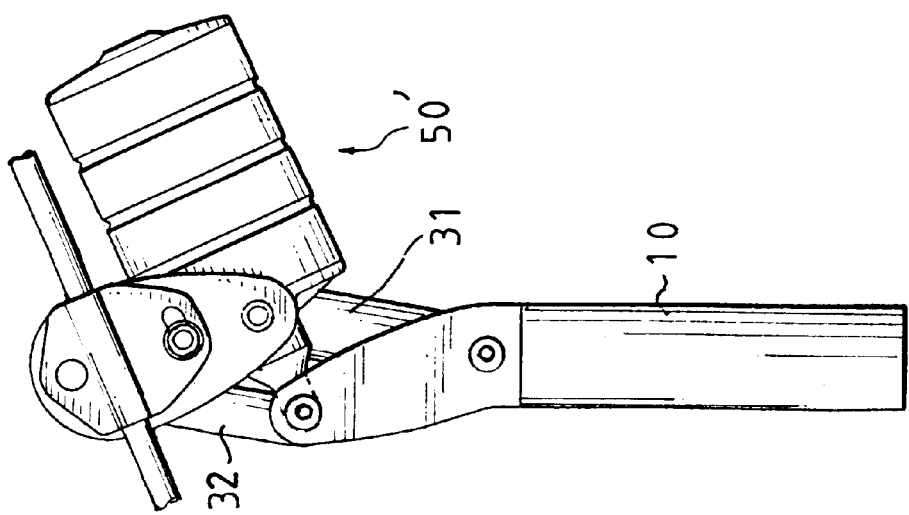
FIG. 7 is a side elevational view of a second embodiment of the seat suspension device of the present invention when not actuated.

FIGS. 7 and 8 show a second embodiment of the suspension device, wherein the two bars 31, 32 are still pivotally connected to the plates 40' each have a shorter length and the rod 54 of the deformable means 50' is pivotally connected to the second holes 211.

Figure 9:
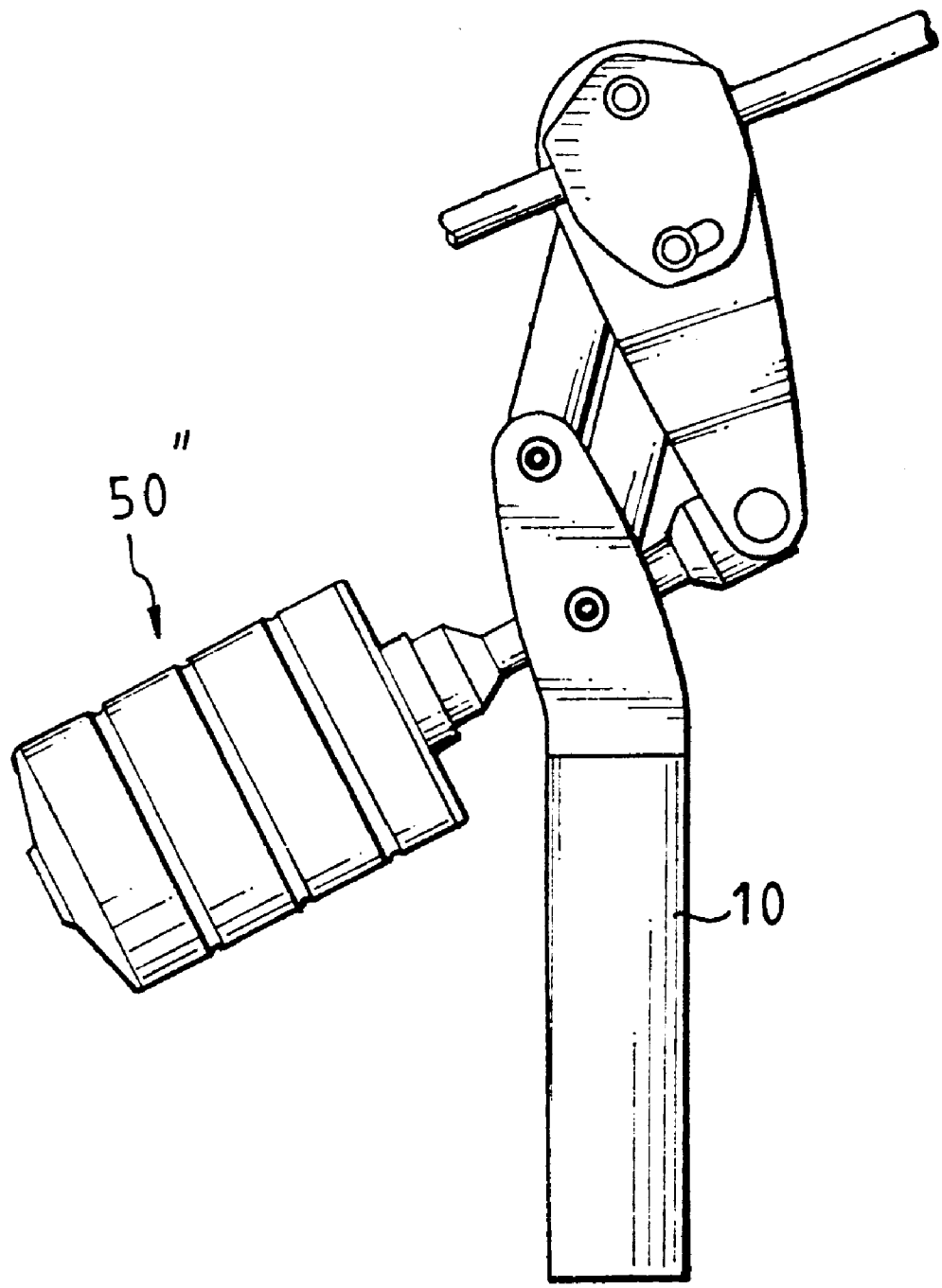
FIG. 9 is a side elevational view of a third embodiment of the seat suspension device of the present invention when not actuated.

FIG. 9 shows a third embodiment of the suspension device, wherein the seat tube 10 is located between the deformable means 50" and the mechanism mentioned above.

Although the invention has been explained in relation to its preferred embodiment, it is to be understood that many other possible modifications and variations can be made without departing from the spirit and scope of the invention as hereinafter claimed.

What is claimed is:

1. A seat suspension device comprising:

a base member capable of being disposed to a seat tube, said base member having two lugs extending therefrom and each of said lugs having a first and a second hole;

a first bar having a first upper tube transversely disposed to an upper end thereof and a first lower tube transversely disposed to a lower end thereof, wherein said first lower tube is pivotally disposed between said two lugs and in alignment with said first holes, and has a cut-away portion defined transversely therein;

a second bar having a second upper tube transversely disposed to an upper end thereof and a second lower tube transversely disposed to a lower end thereof, wherein said second lower tube is pivotally disposed between said two lugs and in alignment with said second holes;

two plates each having a first and a second aperture defined therein, each of said two plates having a recess defined in an inner side of a lower end thereof;

two clamping means fixedly mounted outside said two plates by extending a bolt through said clamping means, said first apertures and said second upper tube which is pivotally connected between said two plates, another bolt extending through said clamping means, said two second apertures and said first lower tube which is pivotally connected between said two plates; and a deformable means having a rod extending from one of two ends thereof and said rod pivotally connected between said two lugs, two studs extending from two opposite sides of said deformable means and pivotally received in said two recesses of said two plates.

2. The seat suspension device as claimed in claim 1 wherein said rod is pivotally received in said cut-away portion.

3. The seat suspension device as claimed in claim 1 wherein said deformable means includes a stack of elastic blocks, a top cap and a bottom cap respectively disposed to two ends of said stack of elastic blocks with a long bolt extending therethrough and threadedly engaged with said rod.

* * * * *